United States Patent [19]
Wang et al.

[11] Patent Number: 6,048,930
[45] Date of Patent: Apr. 11, 2000

[54] GRAFTED MALEIMIDE-STYRENE-G-POLYPROPYLENE COPOLYMERS USED IN RUBBER COMPOUNDS FOR INCREASING HYSTERESIS

[75] Inventors: Xiaorong Wang; Victor J. Foltz, both of Akron, Ohio

[73] Assignee: Bridgestone Corporation, Tokyo, Japan

[21] Appl. No.: 09/073,616

[22] Filed: May 6, 1998

[51] Int. Cl.[7] .................................................. C08G 63/48
[52] U.S. Cl. .............................. 525/66; 524/504; 525/64; 525/73; 525/74; 525/71
[58] Field of Search .................................. 525/73, 66, 74

[56] References Cited

U.S. PATENT DOCUMENTS

| | | |
|---|---|---|
| 3,414,551 | 12/1968 | Reid et al. . |
| 3,428,596 | 2/1969 | Strand et al. . |
| 3,480,580 | 11/1969 | Joyner et al. . |
| 3,481,910 | 12/1969 | Brunson et al. . |
| 3,577,365 | 5/1971 | Folzenlogen . |
| 3,862,265 | 1/1975 | Steinkamp et al. ................ 425/376 |
| 4,404,321 | 9/1983 | Abolins et al. .................... 525/68 |
| 4,404,322 | 9/1983 | Saito et al. ........................ 525/74 |
| 4,408,010 | 10/1983 | Le-Khac ............................. 525/73 |
| 4,506,056 | 3/1985 | Gaylord ............................. 524/445 |
| 4,562,229 | 12/1985 | Walker et al. ..................... 525/71 |
| 5,212,227 | 5/1993 | Sakazume et al. ................ 524/504 |
| 5,244,971 | 9/1993 | Jean-Marc ......................... 525/64 |
| 5,489,657 | 2/1996 | Sue et al. ........................... 526/65 |
| 5,548,031 | 8/1996 | Doi .................................... 525/327.4 |

FOREIGN PATENT DOCUMENTS

| | | |
|---|---|---|
| 0 322 905 | 12/1988 | European Pat. Off. . |
| 0 408 470 | 1/1991 | European Pat. Off. . |
| 0 440 922 | 8/1991 | European Pat. Off. . |
| 0 536 753 | 4/1993 | European Pat. Off. . |
| 0 728 767 | 8/1996 | European Pat. Off. . |
| DE 34 30 802 | 3/1986 | Germany . |
| 42 41 538 A1 | 12/1992 | Germany . |
| 42 41 538 A1 | 6/1994 | Germany . |
| 6-248017 | 9/1994 | Japan . |
| 952151 | 3/1964 | United Kingdom . |
| WO 96/23007 | 8/1996 | WIPO . |

*Primary Examiner*—Ana Woodward
*Attorney, Agent, or Firm*—David G. Burleson; Daniel N. Hall; Scott A. McCollister

[57] ABSTRACT

The present invention teaches a method for enabling the formation of a high damping compound. The method includes: reacting a poly(alkenyl benzene-co-maleimide) polymer with a maleated polyalkylene and an alkyl diamine under substantially dry conditions sufficient to form a polyalkylene grafted poly(alkenyl benzene-co-maleimide) polymer product; and, dispersing the polyalkylene grafted poly(alkenyl benzene-co-maleimide) polymer product within a rubber formulation to form a relatively high damping compound. The present invention also contemplates a rubber compound composition and an article manufactured from the composition.

19 Claims, No Drawings

GRAFTED MALEIMIDE-STYRENE-G-POLYPROPYLENE COPOLYMERS USED IN RUBBER COMPOUNDS FOR INCREASING HYSTERESIS

FIELD OF THE INVENTION

The present invention relates to the use of graft copolymers to increase the hysteresis in rubber compounds.

BACKGROUND OF THE INVENTION

The polymerization of styrene and maleic anhydride by free radical initiation is well known in the prior art. Similarly, poly(styrene-co-maleic anhydride) polymer is well known. Further, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to Monsanto Kasel Kk.; and, Italian Patent EP 322905 A2, assigned to Montedipe S.p.A Various other non-patent publications have also recognized these reactions. Included among them are: L. E. Colleman, Jr., J. F. Bork, and H. Donn, Jr., J. Org. Chem., 24, 185(1959); A. Matsumoto, Y. Oki, and T. Otsu, Polymer J., 23 (3), 201 (1991); L. Haeussler, U. Wienhold, V. Albricht, and S. Zschoche, Themochim. Acta, 277, 14(1966); W. Kim, and K. Seo, Macromol. Rapid Commun., 17, 835(1996); W. Lee, and G. Hwong, J. Appl. Polym. Sci., 59, 599(1996); and, I. Vermeesch and G. Groeninckx;, J. Appl. Polym. Sci., 53, 1356(1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly (acrylonitrile-co-butadiene) and poly(styrene-co-acrylonitrile); PVC (poly(vinyl chloride)); SAN (poly (styrene-co-acrylonitrile)); PMMA (poly(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to increase the hysteresis in rubber compounds. It is particularly desirable to compound rubber compounds with a grafted copolymer having the impact strength of polypropylene and the elastomeric properties of a block copolymer. It is particularly desirable to prepare a polymer useful as an oil substitute that performs the function of a polymer extender or plasticizer while enhancing beneficial polymer properties such as tensile strength, maximum elongation, tear strength, and damping properties.

OBJECTS OF THE INVENTION

Accordingly, it is an object of this invention to provide an oil or low molecular weight component extended grafted "centipede" polymer of a maleated polypropylene and a poly(alkenyl benzene-co-maleimide) that is useful in producing high damping and soft materials.

More specifically, it is an object of this invention to provide a grafted centipede polymer formed by reacting maleated polypropylene and a poly(alkenyl benzene-co-maleimide) with a diamine, useful as an oil substitute to be used as an a polymer extender that enhances beneficial polymer properties such as tensile strength, maximum elongation, tear strength, damping properties, and the like.

Finally, it is yet another object of the invention is to produce a elastomer-centipede polymer blend that exhibits improved properties such as tensile strength, maximum elongation, tear strength, damping properties, and the like.

SUMMARY OF THE INVENTION

The present invention is directed to the use of grafted poly(alkenyl benzene-co-maleimide)-polypropylene copolymers to extend rubbers to improve the tensile strength, tear strength and damping properties of the modified rubber.

The present invention is broadly directed to grafted polymer compositions of a maleated polypropylene and a poly (alkenyl benzene-co-maleimide) reacted with a diamine. The grafted polymer is a thermoplastic, glass-like material that becomes a soft and rubber-like elastomer after being oil-extended.

DETAILED DESCRIPTION OF THE INVENTION

The grafted polymer of the present invention contain: 100 parts by weight of a solid elastomeric polymer such as a thermodynamically miscible elastomeric polymer or copolymer; and 0.5–200 parts by weight of a grafted polymer of a poly(alkenyl benzene-co-maleimide) having at least one maleated polypropylene segments grafted thereto through the at least one functional linkage formed by a cross-linking reaction with a diamine grafting agent.

The poly(alkenyl benzene-co-maleimide) is a "centipede" polymer formed by imidizing a poly(alkenyl benzene-co-maleic anhydride) with a primary amine. The "centipede" polymer has a high molecular weight spine connected with many relatively short side chains formed from the addition of the primary amines. The length of the main chain usually equals or is longer than the entanglement length, which is herein defined theoretically as an order of magnitude of 100 repeating units, while the length of the side chains is much smaller than the entanglement length.

The preferred alkenyl benzenes contributed monomer units of the poly(alkenyl benzene-co-maleimide) "centipede" polymer are either styrene or alpha-methylstyrene. The terms "alkenyl benzene" and "vinyl aromatic" are understood to be interchangeable as used herein.

The poly(alkenyl benzene-co-maleimide) described herein are subsequently graft-reacted through a difunctional linking or grafting agent to a maleated polypropylene to yield a maleated polymer having at least one polypropylene segment grafted thereto through the at least one functional linkages thus formed.

The maleated polypropylene may be any of the conventionally known polypropylene compounds that are subsequently maleated by methods known in the art. The polypropylene grafted segment or segments have molecular weights "$M_w$" of about 10,000 up to about 10,000,000, or higher, preferably about 20,000 to about 300,000.

The crystallinity, or tacticity, of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. Generally, the polypropylene is substantially free of ethylene. However, under certain circumstances small amounts of ethylene, on the order of less than about 10% by weight, may be incorporated. Furthermore, in certain instances the polypropylene contain small amounts of ethylene in copolymers known as "reactor copolymers". Thus, it is within the scope of the invention that the grafted polypropylene contain minor amounts of ethylene, both as part of ethylene-propylene segments and as polyethylene segments.

Polymerization conditions for the preparation of polypropylene are well known in the art. Propylene can be polymerized into isotactic polypropylene in the presence of stereo-specific Ziegler-Natta catalyst systems comprising compounds of the transition metals of Groups 4 to 6 and 8 of the Periodic Table of elements, preferably titanium compounds, most preferably titanium halides, and organometallic compounds of elements of groups 1 to 3 of the Periodic Table, especially aluminum alkyls or aluminum alkyl halides. Illustrative examples include titanium trichloride, titanium tetrachloride as catalysts and triethylaluminum and diethyl aluminum chloride as cocatalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors.

Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C., and is preferably at a range or about 60° C. to about 80° C. Polymerization pressure can also vary over a wide range and is not particularly limited. The polymerization pressure can for example be in the range from between atmospheric pressure to 37,000 KPa. Such procedures and components are only illustrative of the knowledge in the art with respect to polypropylene polymerization, any are contemplated as useful within the scope of the invention. For general review of literature and patents in the art see "Olefin Polymers Polypropylene)" in the Kirk-Othmer Encyclopedia of Chemical Technology, 3rd Edition v. 16, 453–469 (J. Wiley & Sons, 1981).

The maleinization of the polypropylene compound to maleated polypropylene is conveniently accomplished by heating a blend of polypropylene and ethylenically unsaturated carboxyl group-containing compounds, e.g., maleic anhydride, within a range of about 150° to 400° C., often in the presence of free-radical initiators such as organic peroxides that are well-known in the art. Free-radical grafting of the carboxyl group-containing compounds onto the polypropylene readily results. Methods of preparing these grafted polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. Such processes are well-known in the art, for example, an independent source of the description of the process is found in Y. Minoura, M. Ueda, S. Mizinuma and M. Oba, J. Applied Polymer Sci. 1625 (1969). The use of heat and/or physical shearing optionally with the free-radical initiators, in such equipment as extruders, masticators, and the like, to simultaneously accomplish controlled degradation in molecular weight of the polypropylene along with the free-radical grafting of the maleic anhydride, also is known in the art, will be useful in accordance with this invention.

In particular, it is preferable to conduct the maleinization with such amounts of maleic anhydride and free-radical initiators, and under conditions of temperature and shearing such that free-radical sites on the polypropylene are formed substantially at the time of scission of the polypropylene chains and are formed at the point of such scission. The maleic anhydride is then grafted onto the scissioned end of one side of such broken chains. In this manner the anhydride groups are located principally at the ends of the maleated polypropylene chains, and the substantial majority of such maleated polypropylene chains contain one site of maleinization. This procedure permits grafting of the maleated polypropylene at its maleated end to the maleated block copolymer though the use of a difunctional linking or grafting agents having two functional groups each functional group being reactive with a maleate group on the polypropylene and block copolymer. Multiple sites of maleinization can lead to grafting of the maleated polypropylene to more than one maleated block copolymer polymer chain or at more than one site of one or more maleated block copolymer. The same substantial chemistry applies to the centipede polymers of the instant invention.

In accordance with the above, the free-radical initiator is preferably used and will typically be utilized in an amount of from about 0.01 to 1.0 wt. %, preferably from about 0.02 to 0.5 wt. %, and most preferably from about 0.04 to 0.3 wt. % of the total polypropylene, and solvent if used, and will be added first. The mixture is then heated to a temperature at or about the known decomposition temperature of the selected free-radical initiator, concurrently with any optional mechanical shearing. The maleic anhydride is subsequently added in an amount typically from about 0.01 to 10.0 wt. %, preferably from about 0.1 to 5 wt. %, and most preferably about 0.75 to 2 wt. % of the total polypropylene.

The maleated polypropylene of this invention contain from about 0.01 wt. % incorporated maleic anhydride, based upon the weight of the maleated polypropylene, up to about 5 wt. %. Preferably the maleic anhydride content will be from about 0.01 to about 2 wt. %, most preferably about 0.03 to about 0.2 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental affects on the subsequent reaction of the poly(maleimide-co-alkenyl benzene) with the maleated polypropylene.

The poly(alkenyl benzene-co-maleimide) of the present invention is formed by reacting a poly[alkenylbenzene-(co)-(maleic anhydride)] at from about 100° C. to about 250° C. and from about slightly above vacuum to about 20 atmospheres, under substantially dry conditions in the presence of a primary amine. The present invention is preferably directed to a polymer compositions of a poly(styrene-co-maleimide) formed by reacting a poly(styrene-co-maleic anhydride) with a primary amine.

For the purposes of this invention, poly(alkenyl benzene-co-maleimide) and poly(alkyl benzene-co-maleic anhydride) are defined to encompass random and stereo-specific copolymers, including copolymers having alternating alkenyl benzene and maleimide or maleic anhydride contributed monomer units along the polymer backbone. Such alternating structure are typically described as poly(alkenyl benzene-alt-maleimide) and poly(alkyl benzene-alt-maleic anhydride); however, these polymers are encompassed herein within the descriptions poly(alkenyl benzene-co-maleimide) and poly(alkyl benzene-co-maleic anhydride).

Processes for forming poly(alkyl benzene-co-maleic anhydride) polymers are well known to those skilled in the art. The preparation of the copolymers from electron donor monomers, such as styrene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly(alkyl benzene-co-maleic anhydride) polymers are prepared by reacting monomers of alkenylbenzene with maleic anhydride. The preferred alkenyl benzene monomers used for forming the poly(alkyl benzene-co-maleic anhydride) polymer are styrene or α-methylstyrene. Suitable, but less preferred substitutes are: p-methylstyrene, 4-phenylstyrene, m-methylstyrene, o-methylstyrene, p-tert-butylstyrene, dimethylstyrene, and combinations thereof.

The poly(alkyl benzene-co-maleic anhydride) for use in the present invention is a polymer containing from about 5 to 99 mole percent of maleic anhydride monomer with the remainder being alkyl benzene monomer. The preferred poly(alkyl benzene-co-maleic anhydride) contains from 20 to 50 mole percent of maleic anhydride monomer. The most preferred poly(alkyl benzene-co-maleic anhydride) for use in the present invention is poly(styrene-co-maleic anhydride) containing 50 mole percent of maleic anhydride monomer and 50 mole percent of styrene monomer. The comonomers, maleic anhydride and alkenyl benzene, can be randomly or alternatingly distributed in the chain, however, it is preferred to have these comonomers alternating along the polymer backbone chain.

The poly(alkenyl benzene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_w$").

The poly(alkenyl benzene-co-maleimide) of the instant invention is formed by reacting a poly(alkyl benzene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge or in sequential partial charges into the reactor containing a charge of poly(alkyl benzene-co-maleic anhydride). Preferably the primary amine is charged in ratio between 0.8 to 1.0 of moles of amine per monomer contributed units of maleic anhydride in the poly(alkyl benzene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly(alkenyl benzene-co-maleimide), prior to grafting with maleated polypropylene, preferably has a molecular weight range between about 1,000 and up to about 500,000 or higher, more typically between about 10,000 and 500,000, and even more typically between about 150,000 and 450,000, where the molecular weight is weight-average ("$M_w$").

The centipede polymer of the present invention may be prepared by any means well known in the art for combining such ingredients, such as blending, milling or internal batch mixing. A rapid and convenient method of preparation comprises heating a mixture of the components to a temperature of about 50° C. to about 290° C.

The centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or argon, is also preferable.

Grafting of maleated polypropylene and poly(alkenyl benzene-co-maleimide) is performed by addition of a grafting agent such as a polyamine, preferably an organic diamine, to a blend of maleated polypropylene and poly(alkenyl benzene-co-maleimide) to partially cross-link the polypropylene to the poly(alkenyl benzene-co-maleimide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms, e.g., ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline such as 4,4'-methylenedianiline; aniline-formaldehyde resin; and trimethylene glycol di-p-aminobenzoate. Mixtures of these diamines may also be used.

Other suitable polyamines for use as grafting agents in the process according to the present invention include bis-(aminoalkyl)-amines, preferably those having a total of from 4 to 12 carbon atoms, e.g., bis-(2-aminoethyl)-amine, bis-(3-aminopropyl)-amine, bis-(4-aminobutyl)amine and bis-(6-aminohexyl)-amine, and isomeric mixtures of dipropylene triamine and dibutylene triamine. Hexamethylene diamine, tetramethylene diamine, and especially 1,12-diaminododecane are preferably used.

Thus in the preferred embodiment the process for preparing the grafted polymer comprises the steps of:

(A) combining a commercially available poly[alkenylbenzene-(co)-(maleic anhydride)] and a primary amine under substantially dry conditions sufficient to react most of the acid anhydride moieties to form the poly(alkenyl benzene-co-maleimide); and, (B) mixing a commercially available maleated polypropylene with the product of step (A) under substantially dry conditions of elevated temperature; and (C) adding a diamine into the mass of step (B), under condition of agitation sufficient to form the centipede polymer of the instant invention and cooling.

In broadest terms the process for preparing the grafted polymer of this invention comprises combining the poly(alkenyl benzene-co-maleimide) with the maleated polypropylene and the grafting agent under conditions sufficient to permit grafting of at least a minor portion of the poly(alkenyl benzene-co-maleimide) onto the polypropylene. Thus the grafted centipede polymer composition of this invention will comprise the reaction product of the above described, the poly(alkenyl benzene-co-maleimide) grafting agent and the maleated polypropylene. The grafting reaction is accomplished by contacting the grafting agent and the poly(alkenyl benzene-co-maleimide) with the maleated polypropylene whereupon interaction and cross linking take place. Apparently the primary amino groups of the grafting agent react to form covalent chemical bonds (imide bonds) with the maleic moieties of the maleated polypropylene and the poly(alkenyl benzene-co-maleimide). The polypropylene is thus grafted to the poly(alkenyl benzene-co-maleimide) through covalent chemical functional linkages.

For best results, a proportion of approximately one-half molar equivalent of grafting agent per molar equivalent of maleic moiety can be employed due to the difunctionality of the grafting agent. The contacting can be accomplished by combining solutions of the polymeric reactants in suitable solvents, such as benzene, toluene, and other inert organic and inorganic solvents, in a suitable reaction vessel under substantially anhydrous conditions. Heating will accelerate the reaction and is generally preferred. However, the reaction is exothermic and will occur at ambient temperatures. More preferably commercially, the contacting can be accomplished by premixing pre-formed pellets of the neat functionalized polymers and adding the grafting agent and melt processing in a physical blender or mixer, such as a Brabender mixer or an extruder, at temperatures of from about ambient to about 350° C., preferably about 75° to about 300° C., and most preferably 120° C. to about 250° C. It is important that essentially all moisture or water be removed by drying prior to contacting the polymer reactants in order to avoid hydrolysis reactions which will compete with the sought cross linking and reduce the yield of the grafted copolymer composition of this invention.

The amounts of poly(alkenyl benzene-co-maleimide) and maleated polypropylene reacted into the grafted compositions of the invention may vary somewhat depending upon the properties desired in the finished composition. In general, the amounts of maleated polypropylene included in the grafted composition may range from about 1 to about 50 percent by weight based on total weight of composition. Preferred amounts of maleated polypropylene are from 1 to 30 percent by weight with a particularly preferred amount being from 10 to 25 percent by weight. The amounts of poly(alkenyl benzene-co-maleimide) centipede polymer included in the grafted composition may range from about 99 to about 50 percent by weight based on total weight of composition. Preferred amounts of the centipede polymer are from 99 to 70 percent by weight with a particularly preferred amount being from 90 to 75 percent by weight.

In accordance with the present invention, the grafted copolymer composition of the present invention may be added as an additive or as a plasticizer to an elastomeric polymer in an amount ranging from about 0.5 to 200 parts by weight per 100 parts by weight of a solid elastomeric polymer; preferably in an amount ranging from about 0.1 to about 50 parts by weight of graft copolymer per 100 parts by weight of the elastomeric polymer to be extended. Most preferred amounts of added graft copolymer include from about 0.5 to about 20 parts of graft copolymer per 100 parts of the elastomeric polymer. These parts by weight being effective plasticizing amounts of graft copolymer in elastomers.

Typical, but by no means limited to the types of thermodynamically miscible elastomeric polymers and copolymers that may be compatibly blended and extended by the grafted copolymers of the present invention are elastomeric polymer containing formulations include but not limited to all natural and synthetic polymers and mixtures thereof which are elastomers including: natural rubber, polyisoprene, both cis and trans polybutadiene, butadiene/styrene rubber (SBR), butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, for example, copolymers of isoprene and butadiene, butadiene and piperylene, and the like and blends thereof SBR and polybutadiene are preferred elastomers.

The synthetic or rubber elastomers of the present invention are polymers or copolymers made from monomers or comonomers, generally considered by those skilled in the art, capable of forming rubber elastomers. More specifically, the monomers are selected from the group of compounds consisting of conjugated dienes having from 4 to about 10 carbon atoms, comonomers of various dienes having from 4 to 10 carbon atoms so that copolymers are formed and monomers of dienes having from 4 to 10 carbon atoms with olefins having from 2 to 14 carbon atoms. A preferred group of olefin compounds are the vinyl substituted aromatic hydrocarbons containing from 8 to 12 carbon atoms and includes styrene, α-methylstyrene, ortho-, para, and meta-methyl and ethyl styrene and the like. Specific examples of olefins include methene, propene, butene, pentene, hexene, heptene, octene, nonene, decene, dodecene and the like. Concerning the diene compounds, the dienes having from 4 to 6 carbon atoms are preferred.

The synthetic elastomers are prepared according to conventional or common methods or processes well known to those skilled in the art. Generally, an emulsion process may be utilized or a free radical process wherein the elastomer monomer is soluble in a solvent. Of course, the elastomers may additionally be prepared utilizing an anionic polymerization with various commonly employed catalysts such as organolithium compounds.

The use of graft copolymers produced according to the present invention as plasticizers for elastomeric polymers either alone or as a partial oil substitute increases the damping properties of the elastomeric polymers over comparable oil extended polymers. The use of the graft copolymers as an extender in elastomeric polymers also increases the tensile strength, the maximum elongation, tear strength and the travel at tear characteristics versus elastomers extended with a comparable amount of oil extender.

Although the present invention also contemplates use of the present graft copolymers in combination with conventional extender oils as additives to elastomers, an embodiment contemplates the total substitution of conventional extenders by graft copolymers. Typical prior art extenders replaced by the present graft copolymers include extender oils and low molecular weight compounds or components. Such extender oils include those well known in the art such as naphthenic, aromatic and paraffinic petroleum oils and silicone oils. Examples of low molecular weight organic compounds or components extenders in the compositions that may be replaced by the graft copolymers of the present invention are low molecular weight organic materials having a number-average molecular weight of less than 20,000, preferable less than 10,000, and most preferably less than 5,000. Although there is no particular limitation to the material that the instant graft copolymers replace in prior art rubber compounds, the following is a list of examples of appropriate replaceable materials or extenders: (1) softening agents, namely aromatic, naphthenic and paraffinic oil softening agents for rubbers or resins; and (2) plasticizers, namely plasticizers composed of esters including phthalic, mixed phthalic, aliphatic dibasic acid, glycol, fatty acid, phosphoric and stearic esters, epoxy plasticizers, other plasticizers for plastics; and (3) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins. The present graft coolymers can be used to replace or partially replace one or more or all of these extenders.

The graft copolymers of the present invention can have an extender added to the prepared grafted copolymers during final processing. Suitable extenders include extender oils and low molecular weight compounds or components, such as the extenders discussed herein above including: naphthenic, aromatic and paraffinic petroleum oils and silicone oils.

In accordance with the present invention, the grafted polymer composition of the present invention may have added thereto from about 1 to 1,000 parts by weight of extender per 100 parts by weight of the grafted copolymers. Most preferred amounts of added extender include from about 1 to about 500 parts of oil per 100 parts of grafted copolymer and ideally about 1 to about 30 parts of extender per 100 parts of grafted copolymer.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl)benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of the combined grafted copolymer and elastomeric polymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4)polyisoprene-polystyrene block copolymers such as Hybler (produced by Kurare Inc.), polynorbornenes such as Norsorex (produced by Nippon Zeon Inc.) and the like. In this case the foregoing materials are equally applicable to the instant centipede polymer compositions.

The compositions of the present invention may be prepared by any means well known in the art for combining such ingredients, such as solution blending, milling, internal batch mixing, or continuous extrusion of a solid form of the graft polymer and rubber compositions and the other ingredients. A rapid and convenient method of preparation comprises heating a mixture of the components to a temperature of about 50° C. to about 290° C.

The grafted poly(alkenyl benzene-co-maleimide)-polypropylene compositions of the present invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or argon, is also preferable.

The composition obtained using the manufacturing method of this invention can be molded with equipment conventionally used for molding thermoplastics. It is suitable for extrusion molding, calendar molding, and particularly injection molding.

The composition of the present invention can be mixed in any conventional mixer such as a Banbury mixer or roll mill or extruder normally conducted within the temperature range of about 120° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when forming the molded articles.

In summary, the molded polymers produced from the blend of an elastomer and grafted poly(alkenyl benzene-co-maleimide)-polypropylene compositions of the present invention retain elastomeric characteristics and are useful in high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan $\delta$. A forced oscillation is applied to a material at frequency f and the transmitted force and phase shift are measured. The phase shift angle delta is recorded. The value of tan $\delta$ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan $\delta$ vs. frequency by curve alignment. An alternate method is to measure tan $\delta$ at constant frequency (such as at 10 hz) over a temperature range. We have defined a thermoplastic unfilled material as useful for damping when tan $\delta$>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, medical instruments and tire rubber formulations.

Representative examples of the use of the graft copolymers rubber blends of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Futhermore these materials are suitable for use in racing tire formulations.

In the following, the present invention will be described in more detail with reference to non-limitative examples. The following examples and tables are presented for purposes of illustration only and are not to be construed in a limiting sense.

PREPARATION OF CENTIPEDE POLYMER

EXAMPLE 1

A nitrogen purged Brabender mixer (~310 gram capacity) equipped with a Banbury blade was initially set to 12 rpm and the temperature was set to 80° C. The mixer was then charged with 150 g of poly(styrene-alt-maleic anhydride) (obtained from Aldrich Chemical Company of 1001 West Saint Paul Avenue, Milwaukee, Wis. Catalog Number: 18,293-1, CAS Number: 9011-13-6)($M_n$=350,000) and 96 g of octyl amine (obtained from Aldrich, 98% purity). The contents of the mixer was then agitated for 15 minutes and then was heated at a rate of about 10° C./minute to 210° C. Once the temperature reached 145° C., the agitation was turned off. When the temperature reached 210° C., the heating element was set at isothermal conditions and the agitation was set to 70 rpm. After 70 minutes the agitation speed adjusted to 90 rpm and nitrogen purging was commenced at a rate of about 80 ml/minute. Agitation was continued for an additional 30 minutes and then the heating element of the mixer was turned off, and the polymer mass within the mixer was permitted to cool down to 150 at a rate of ~4° C./min. The agitation was then stopped and the centipede polymer product mass was then removed from the mixer at 160° C.

IR absorption peaks characteristic of the centipede polymer mass were noted substantially at 705 $cm^{-1}$, 1701 $cm^{-1}$, 1770 $cm^{-1}$, 2855 $cm^{-1}$ and 2926 $cm^{-1}$. The ratio of the intensities was observed at $I_{2926}$ to $I_{1701}\cong 0.55$. The intrinsic viscosity of the final product was 0.54 as measured in tetrahydrofuran (THF) at 25° C. The acid value of the product was 0.182 meg/g as measured in THF using a NaOH titration method. The DSC characteristic $T_g$ value was broad, starting from 50 to 75° C. with the $T_g$ being estimated at about 50° C.

EXAMPLE 2

Grafting of the Centipede Polymer and Maleated Polypropylene

A nitrogen purged Brabender mixer (~310 g capacity) equipped with a Banbury blade was initially set to 60 rpm and 195° C. The mixer was then charged with 40 g of commercial maleated poypropylene (from the Exxon Chemical Company, trade name Exxelor PO 1015). After six minutes, a charge of 160 g of the centipede polymer product of Example 1 was added to the mixer. The polymers were agitated for an additional 12 minutes. A charge of 1.6 g of dodecane diamine (from Aldrich, purity=98%) was then added, and at the same time the agitation speed was readjusted to 120 rpm and nitrogen purging was turned off. After seven minutes the torque of the mixer increased and the agitation speed was again readjusted to 60 rpm and nitrogen purging was turned on. After additional mixing at 60 rpm for eight minutes, the heating element of the mixer was turned off and the agitation speed was again readjusted to 40 rpm. The mixture was permitted to cool to about 160° C. at a rate of ~4° C./min. Finally, agitation was discontinued and the grafted polymer product was removed from the mixer.

The grafted polymer was a thermoplastic material being remoldable at temperatures above 160° C. and it displayed excellent elasticity and softness when extended with oils.

EXAMPLES 3 TO 9

Application of the Grafted Polymers in Rubber Compounds

In Examples 3 to 8, rubber compositions were prepared according to the formulation as displayed in parts by weight as shown in Table 1. In Examples 4 to 7 the graft polymer of Example 2 was used to at least partially replace that amount of aromatic oil normally used, as shown in Table 3. Although the respective amounts of aromatic oil and graft polymer were varied, the sum of the respective amounts (18.25 parts by weight) was kept constant in all compounds. The rubber compound used in the formulation in Table 1 was an oil-extended high-styrene SBR (20 phr aromatic oil) which contained 33% bound styrene with a $T_g$=−47° C. The cis-BR used was a high-cis polybutadiene with a cis content of 96%. In each example, the components were kneaded by the method indicated in Table 2. The final stock was sheeted and molded at 165° C. for ~15 minutes.

For each of the sample vulcanized rubber compounds of Examples 3 to 8, measurements of the modulus of elasticity; maximum elongation; tensile strength; tear strength; and, hysteresis loss were taken. The results of these measurements appears in Table 3. Measurements of tensile strength were based upon the conditions of ASTM-D 412 at 22° C. Test specimen geometry was taken in the form of a ring having a width of 0.05 inches and a thickness of 0.075 inches. The specimen was tested at a specific gauge length of 1.0 inches. The measurements of tear strength were based on conditions of ASTM-D 624 at 170° C. Test specimen geometry was also taken in the form of a nicked ring in accordance with the conditions defined in ASTM-624-C. The specimen was tested at the specific gauge length of 1.750 inches. The hysteresis loss was measured with a Dynastat Viscoelastic Analyzer. The test specimen geometry was also taken in the form of a cylinder of a length of 0.6125 inches and a diameter of 0.375 inches. The specimen was tested at a frequency of 1 Hz and a temperature of 50° C. A static mass of 2.0 Mpa and a dynamic mass of 2.50 MPa were applied for the test. As can be seen in Table 3, the rubber compositions of Examples 4–7 exhibited very well balanced: tensile strengths; tear strengths; and, damping properties. The tensile strength, tear strength and damping properties of the modified rubber compounds, i.e. Examples 4 to 7, were improved in comparison to the oil extended rubber compounds of Comparative Examples 3 and 8, basing the comparison upon the same modulus conditions.

Accordingly, it was concluded that the modified polymers developed according to the present invention (as shown in Example 2) are suitable as high damping additives in rubber compounds. It was further concluded that these polymers could be used as alternative substitutes for oils and/or plasticizers.

TABLE 1

| | |
|---|---|
| Styrene-Butadiene Rubber (SBR, Duradene 753) | 96.80 |
| Butadiene Rubber (cis-BR, Diene 600) | 20.00 |
| Carbon Black (ISAF) | 70.00 |
| Aromatic Oil | 18.25 |
| Stearic Acid | 2.00 |
| Wax | 1.50 |
| Antioxidant [N-(1,3 dimethylbutyl)-N'-phenyl-p-phenylene-diamine] | 0.95 |
| Sulfur | ~1.70 |
| Accelerator [N-tert-butyl-benzothiazolesulfenamine] | 0.80 |
| Zinc Oxide | 2.00 |
| Antioxidant [polymerized 1,2-dihydro-2,2,4-trimethylquinoline] | 0.22 |
| Accelerator (benzothiazyl disulfide) | 0.20 |
| Accelerator (tetra-methylthiuram monosulfide) | 0.20 |

TABLE 2

| | |
|---|---|
| Mixer | 310 g Brabender |
| Agitation Speed | 60 rpm |
| Mater Batch Stage | |
| Initial Temperature | 110° C. |
| 0 sec | charging polymers |
| 30 sec | charging carbon black and all pigments |
| 5 min | drop |
| Remill Batch Stage | |
| Initial Temperature | 110° C. |
| 0 sec | charging mater batch stock |
| 4 min | drop |
| Final Batch Stage | |
| Initial Temperature | 75° C. |
| 0 sec | charging remilled stock |
| 30 sec | charging curing agent and accelerators |
| 80 sec | drop |

TABLE 3

| Example No. | Grafted Polymer content (parts by weight) | Modulus at 23° C. at 10% elongation (lbs/in) | Tensile[a] strength at 23° C. (psi) | Maximum elongation at 23° C. (%) | Tear[b] strength at 170° C. (psi) | Travel at Tear at 170° C. (%) | Tan δ at 50° C. |
|---|---|---|---|---|---|---|---|
| 3 (comp.) | 0 | 151.5 ± 4.5 | 2793 ± 21 | 595 ± 21 | 211 ± 33 | 356 ± 37 | 0.217 |
| 4 | 5 | 157.9 ± 0.7 | 2687 ± 99 | 580 ± 20 | 217 ± 21 | 338 ± 26 | 0.229 |
| 5 | 10 | 208.4 ± 9.4 | 2842 ± 94 | 526 ± 34 | 196 ± 27 | 300 ± 28 | 0.242 |

TABLE 3-continued

| Example No. | Grafted Polymer content (parts by weight) | Modulus at 23° C. at 10% elongation (lbs/in) | Tensile[a] strength at 23° C. (psi) | Maximum elongation at 23° C. (%) | Tear[b] strength at 170° C. (psi) | Travel at Tear at 170° C. (%) | Tan δ at 50° C. |
|---|---|---|---|---|---|---|---|
| 6 | 15 | 206.3 ± 7.9 | 2520 ± 47 | 522 ± 16 | 233 ± 30 | 329 ± 30 | 0.268 |
| 7 | 8 | 180.3 ± 6.3 | 2813 ± 71 | 568 ± 11 | 214 ± 28 | 314 ± 29 | 0.245 |
| 8 (comp.) | 0 | 156.4 ± 7.0[c] | 2746 ± 89 | 545 ± 6 | 201 ± 33 | 280 ± 34 | 0.201 |

[a]Tensile test results were based on the average of three specimens
[b]Tear test results were based on the average of four specimens
[c]The compound properties, e.g., modulus and tan δ, were adjusted by increasing sulfur content

We claim:

1. A method for the formation of a high damping copolymer blend, comprising:
   mixing an elastomeric polymer or copolymer with a polyalkylene grafted poly(alkenyl benzene-co-maleimide) copolymer comprising from about 50 wt % to about 99 wt % of poly(alkenyl benzene-co-maleimide) contributed units and about 1 wt % to about 50 wt % of maleated polyalkylene contributed units.

2. The method of claim 1, comprising:
   mixing an elastomeric polymer or copolymer with a polyalkylene grafted poly(alkenyl benzene-co-maleimide) copolymer comprising from about 75 wt % to about 90 wt % of poly(alkenyl benzene-co-maleimide) contributed units and about 10 wt % to about 25 wt % of maleated polyalkylene contributed units.

3. The method of claim 1, wherein the alkenylbenzene contributed units of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

4. The method of claim 1, wherein the alkylene contributed units of said maleated polyalkylene is selected from the group consisting of ethylene, propylene and mixtures thereof.

5. The method of claim 1 wherein the maleimide contributed units of the poly(alkenyl benzene-co-maleimide) is formed by the reaction of maleic anhydride and a primary amine.

6. The method of claim 5 wherein the primary amine is selected from the group consisting of: alkyl amines; allyl benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

7. The method of claim 1 wherein the polyalkylene grafted poly(alkenyl benzene-co-maleimide) copolymer is formed by reacting a poly(alkenyl benzene-co-maleimide) and maleated polyalkylene with a polyamine.

8. The method of claim 7 wherein said polyamine corresponds to the formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms.

9. The method of claim 7 wherein said polyamine is selected from the group consisting of: ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropylcyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$-$C_6$-dianiline such as 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixtures of dipropylene triamine and dibutylene triamine; and mixtures thereof.

10. The method of claim 1 wherein the elastomeric polymer or copolymer is selected from the group consisting of: natural rubber, polyisoprene, polybutadiene, butadiene/styrene rubber (SBR), ethylene/propylene copolymer rubbers, butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, and blends thereof.

11. The method of claim 1 wherein the high damping copolymer blend comprises: 0.5 to 200 parts by weight the polyalkylene grafted poly(alkenyl benzene-co-maleimide) copolymer per 100 parts by weight of the elastomeric polymer.

12. An elastomeric polymer composition comprising:
    an elastomeric polymer or copolymer and a polyalkylene grafted poly(alkenyl benzene-co-maleimide) comprising 50 wt % to about 99 wt % of poly(alkenyl benzene-co-maleimide) contributed units and 1 wt % to about 50 wt % of maleated polyalkylene contributed units.

13. The elastomeric polymer composition of claim 12 wherein the polyalkylene grafted poly(alkenyl benzene-co-maleimide) comprises from about 75 wt % to about 90 wt % of poly(alkenyl benzene-co-maleimide) contributed units and about 10 wt % to about 25 wt % of maleated polyalkylene contributed units.

14. The elastomeric polymer composition of claim 12, wherein the monomer for forming the alkenyl benzene moiety of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

15. The elastomeric polymer composition of claim 12, wherein the monomer for forming the alkylene moiety of said maleated polyalkylene is selected from the group consisting of ethylene, propylene and combinations thereof.

16. The elastomeric polymer composition of claim 12 wherein the polyalkylene grafted poly(alkenyl benzene-co-maleimide) copolymer is formed by reacting of poly(alkenyl benzene-co-maleimide) and a maleated polyalkylene with a polyamine.

17. The elastomeric polymer composition of claim 16, wherein said polyamine is selected from the group consisting of: ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline such as 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixtures of dipropylene triamine and dibutylene triamine; and mixtures thereof.

18. The elastomeric polymer composition of claim 16 wherein the elastomeric polymer or copolymer is selected from the group consisting of: natural rubber, polyisoprene, polybutadiene, butadiene/styrene rubber (SBR), ethylene/propylene copolymer rubbers, butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, and blends thereof.

19. The elastomeric polymer composition of claim 12 wherein the elastomeric polymer composition comprises: 0.5 to 200 parts by weight the polyalkylene grafted poly (alkenyl benzene-co-maleimide) copolymer per 100 parts by weight of the elastomeric polymer.

* * * * *